Oct. 23, 1951     J. E. SELANDER     2,572,528
CENTRIFUGAL COIL CLUTCH
Filed Nov. 18, 1947
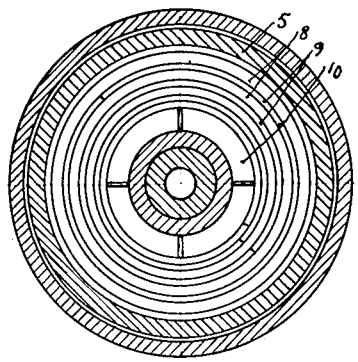
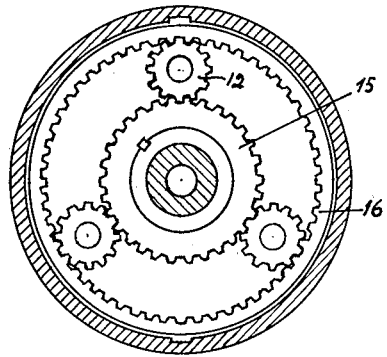
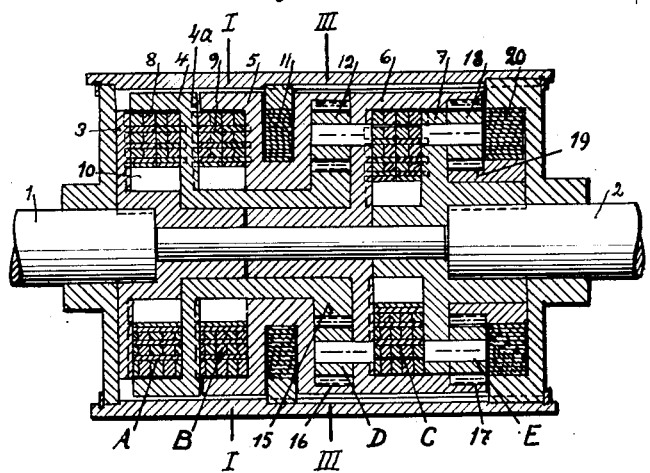
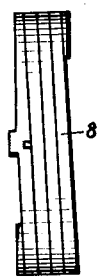
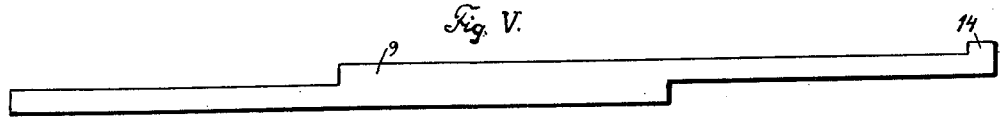
INVENTOR.
Johan Emil Selander
BY Patented Oct. 23, 1951

2,572,528

UNITED STATES PATENT OFFICE 2,572,528

CENTRIFUGAL COIL CLUTCH

Johan Emil Selander, Goteborg, Sweden

Application November 18, 1947, Serial No. 786,593
In Sweden December 6, 1946

2 Claims. (Cl. 192—105)

The present invention relates to certain novel improvements in couplings for autocar engines and more specifically to couplings of friction type.

The principal object of the invention is to provide a coupling which automatically is brought into function at a certain revolution speed.

Another object of the invention is to provide a coupling with a smooth and shock-free function which in coaction with other couplings of same type and with speed transmitting gears will automatically and successively transmit different speed revolutions to a driven axle.

Other objects will appear hereinafter.

The invention consists of a coupling with lamels of a certain construction being able to expand and thereby press against each other to increase the friction.

The invention will be best understood by reference to the accompanying drawing, showing the preferred form of construction and in which:

Fig. I is a cross sectional view along the section line I in Fig. II;

Fig. II is a longitudinal section of a coupling aggregate;

Fig. III is a cross sectional view along the section line III in Fig. II;

Fig. IV is a side view of a spiral spring lamel; and

Fig. V a plan view of a spring ring lamel in a stretched condition, in a greater scale.

The coupling is of friction type and built up in accordance with the lamel principle with lamels of a special construction. Referring at first to the coupling A per se, shown in the left portion of a speed transmission aggregate in Fig. II, this coupling consists of the two coupling halves 3 and 4 and constitutes a part of the said total aggregate which is adapted to transmit different speed revolutions from a driving axle 1 to an outgoing driven axle 2.

Said coupling A has a number of lamels 8 attached to the coupling half 3 and lying between lamels 9 attached to the coupling half 4. Each lamel 8 consists in the exemplified embodiment of a spiral spring, the construction of which is shown in Fig. IV, and each lamel 9 consists of a split spring ring, shown in stretched position in Fig. V. The spiral spring 8 has a shoulder 13 near the one end, by which shoulder the spiral spring is held in a recess of the coupling half 3, so that the spiral spring is free to expand radially, and the spring ring 9 has in the same way an extension 14 at its one end in the cross direction thereof, by which the spring ring is held in a recess of the coupling half 4, enabling the same also to expand radially. In order to equalize the centrifugal stresses and prevent vibrations the spring ring is partly cut up longitudinally as seen in Fig. V, so that the spring ring will in ring shape have two diametrally positioned end spaces of like volume. Between the hub of the coupling half 3 and the innermost spring ring free-lying weights 10 are inserted, guided for instance in radial channels in the side of said coupling half, and arranged to press against the innermost spring ring by centrifugal force, and the coupling half 4 has an outer ring flange taking up the radial press.

In the speed transmitting aggregate exemplified in the drawing in Fig. II, three lamel couplings A, B, and C of the same type are arranged to work in combination with two planetary gears D and E. This aggregate is adapted for three different speed transmissions. As mentioned above the coupling A consists of the coupling halves 3 and 4, the coupling half 3 being attached to the driving axle 1. The coupling B consists of the coupling halves 4a and 5, and the coupling C of the coupling halves 6 and 7. The coupling half 4a is formed out of the backside portion of the coupling half 4. This coupling half is connected to the sun wheel 15 of the planetary gear D, the planet wheels 12 of which being freegoing on axle pins which are fixed to the coupling half 6.

Of the planetary gear D, consisting of the sun wheel 15, the planet wheels 12 and the outer ring wheel 16, the latter is connected to the coupling half 5, which is prevented from back-turning by a free-wheel spring 11 of known construction. The coupling half 6 is connected to the outer ring wheel 17 of the other planetary gear E, the planet wheels 18 of which revolve freely on axle pins fixed to the coupling half 7, which coupling half is connected to the outgoing driven axle 2. The sun wheel 19 of the gear E is a freegoing wheel prevented from back-turning by a free-wheel spring 20. All the lamel couplings A, B and C have free-lying weights designated 10 for the coupling A. The weights for the coupling A are heavier than the weights for the coupling B, and the latter weights are heavier than the weights for the coupling C. Instead of different weights the couplings A, B, and C can be provided with springs of different strength.

Arranged in such a way in the speed transmitting aggregate the lamel couplings A, B and C will automatically and successively be brought into action at an increasing speed of the driving axle 1. At a certain speed revolution $n_1$ the coupling A will couple the coupling halves 3 and 4 together, and the speed will be transmitted from the driving axle 1 through the wheels 3, 4, 15, 12, 6, 18 and 7 to the driven axle 2, which may receive for instance the speed revolution $N_1$. When the speed revolution of the driving axle 1 is increased to $n_2$ the coupling B also will be active and couple the coupling halves $4a$ and 5 together, so that the speed will be transmitted through the wheels 3, 4, 15, $4a$, 5, 16, 12, 6, 18 and 7 from the driving axle 1 to the driven axle 2, which now may receive the speed revolution $N_2$. As may be understood the planet wheels 12 will not in this case revolve on their axle pins, so that the driving axle 1, and the wheels 3, 4, 5 and 6 are actually coupled rigidly together and have the same revolution speed. When now the speed revolution of the driving axle will further increase to $n_3$ the coupling C also will be active, coupling the coupling halves 6 and 7 together with the result that a direct rigid coupling between the driving axle 1 and the driven axle 2 is produced.

As easily understood the number of the lamel couplings and planetary gears is optional. It is essential, however, that if two or more lamel couplings are coacting they are combined with planetary gears. If the speed transmission aggregate shall transmit only two different speed revolutions it is enough to construct the aggregate with the couplings A and B with the planetary gear D, in which case the wheel 6 has to be attached to the axle 2. If this aggregate is designated X, and the aggregate described above for three different transmission speeds is designated Y, one can by different combinations of X, X or X, Y or Y, Y obtain every number of different speed revolutions.

While I have illustrated and described the preferred form of construction for carrying my invention into effect, this is capable of variation and modification, without departing from the spirit of the invention.

Having thus described my invention what I claim as new and desire to protect by Letters Patent is:

1. A friction clutch comprising a driving shaft; a driven shaft; at least one pair of cooperating clutch members, one of said clutch members being operatively connected to said driving shaft and the other of said members being operatively connected to said driven shaft; an outer axial flange provided on said driven clutch member; at least one pair of generally cylindrical, radially expansible spring members arranged inwardly of said flange so as to become frictionally interengaged upon radial expansion at a predetermined speed of said driving shaft; one of said spring members comprising a coil spring and the other of said spring members comprising a split ring; said coil spring being secured by one of its axial end faces to a respective adjacent portion of said driving clutch member and having its other end freely disposed in order to permit free expansion of said entire spring; said split ring spring being secured to a respective adjacent portion of the driven clutch member by one of its axial end faces and having its other end free in order to permit free expansion of said entire split ring; said split ring comprising a central portion of fixed width and a pair of reduced, symmetrically overlapping terminal portions.

2. A friction clutch comprising a driving shaft; a driven shaft; at least one pair of cooperating clutch members, one of said clutch members defining a radial wall portion therein and being operatively connected to said driving shaft and the other of said members being operatively connected to said driven shaft; an outer axial flange provided on said driven clutch member; at least one pair of generally cylindrical, radially expansible spring members arranged inwardly of said flange so as to become frictionally interengaged upon radial expansion at a predetermined speed of said driving shaft; one of said spring members comprising a coil spring and the other of said spring members comprising a split ring; said coil spring being secured by one of its axial end faces to said radial wall portion of said driving clutch member and having its other end freely disposed in order to permit free expansion of said entire spring; said split ring spring being secured to a respective adjacent portion of the driven clutch member by one of its axial end faces and having its other end free in order to permit free expansion of said entire split ring; said split ring comprising a central portion of fixed width and a pair of reduced, symmetrically overlapping terminal portions.

JOHAN EMIL SELANDER.

REFERENCES CITED

The following references are of record in the file of this patent:

UNITED STATES PATENTS

| Number | Name | Date |
|---|---|---|
| 885,207 | Whitcomb | Apr. 21, 1908 |
| 1,109,232 | Kingsbury | Sept. 1, 1914 |
| 1,197,895 | Bendl | Sept. 12, 1916 |
| 1,481,593 | Fieux | Jan. 22, 1924 |
| 1,843,195 | Banker | Feb. 2, 1932 |
| 1,870,649 | Rawson | Aug. 9, 1932 |
| 2,044,420 | Collyear | June 16, 1936 |
| 2,120,733 | Cotal | June 14, 1938 |
| 2,169,523 | Fleischel | Aug. 15, 1939 |

FOREIGN PATENTS

| Number | Country | Date |
|---|---|---|
| 153,549 | Great Britain | Jan. 13, 1921 |
| 714,669 | France | Nov. 18, 1931 |
| 16,742 of 1934 | Australia | Mar. 13, 1935 |